(12) United States Patent
Nageshkar et al.

(10) Patent No.: US 11,485,266 B1
(45) Date of Patent: Nov. 1, 2022

(54) SUPPORT ASSEMBLY

(71) Applicant: Ford Global Technologies, LLC, Dearborn, MI (US)

(72) Inventors: Vishal Vinayak Nageshkar, Farmington Hills, MI (US); Sangram Tamhankar, Canton, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 17/319,233

(22) Filed: May 13, 2021

(51) Int. Cl.
*B60N 3/06* (2006.01)

(52) U.S. Cl.
CPC ................................ *B60N 3/063* (2013.01)

(58) Field of Classification Search
CPC .............................. B60N 3/002; B60N 3/063
USPC ....................................... 296/75; 297/423.37
See application file for complete search history.

(56) References Cited

U.S. PATENT DOCUMENTS

| | | | |
|---|---|---|---|
| 2,464,370 A * | 3/1949 | Bell | B61D 33/005 297/423.15 |
| 2,981,576 A | 4/1961 | Robinson | |
| 5,311,826 A | 5/1994 | Baggiani | |
| 7,451,709 B2 | 11/2008 | Swartfager et al. | |
| 7,455,342 B2 * | 11/2008 | Lechkun | B60N 2/995 296/64 |
| 9,616,784 B2 * | 4/2017 | Nagayasu | B64D 11/0643 |
| 10,107,502 B2 | 10/2018 | Mueller et al. | |
| 10,506,882 B2 | 12/2019 | Caulk | |
| 10,849,432 B2 * | 12/2020 | Pritchard | A47C 7/5062 |
| 2018/0279779 A1 * | 10/2018 | Foohey | B60N 3/002 |
| 2019/0031055 A1 * | 1/2019 | Line | B60N 2/32 |
| 2019/0232847 A1 * | 8/2019 | Kim | B60N 3/063 |
| 2021/0024013 A1 * | 1/2021 | Quesnel | B60N 3/102 |

FOREIGN PATENT DOCUMENTS

| | | | | |
|---|---|---|---|---|
| CN | 109249847 A | * | 1/2019 | ............. B60N 3/063 |
| KR | 101125784 B1 | | 3/2012 | |
| KR | 200477006 Y1 | * | 5/2015 | ............. B60N 3/063 |

* cited by examiner

*Primary Examiner* — D Glenn Dayoan
*Assistant Examiner* — Kevin P Weldon
(74) *Attorney, Agent, or Firm* — Vichit Chea; Price Heneveld LLP

(57) ABSTRACT

A support assembly for a vehicle is provided that includes a base fixedly coupled to a vehicle interior, a panel disposed on the base, and a track assembly disposed between the base and the panel. The track assembly includes a track and an actuator slidably coupled with the track and coupled with the panel and movable from a first position to a second position to move the panel from a stored position to a deployed position.

13 Claims, 9 Drawing Sheets

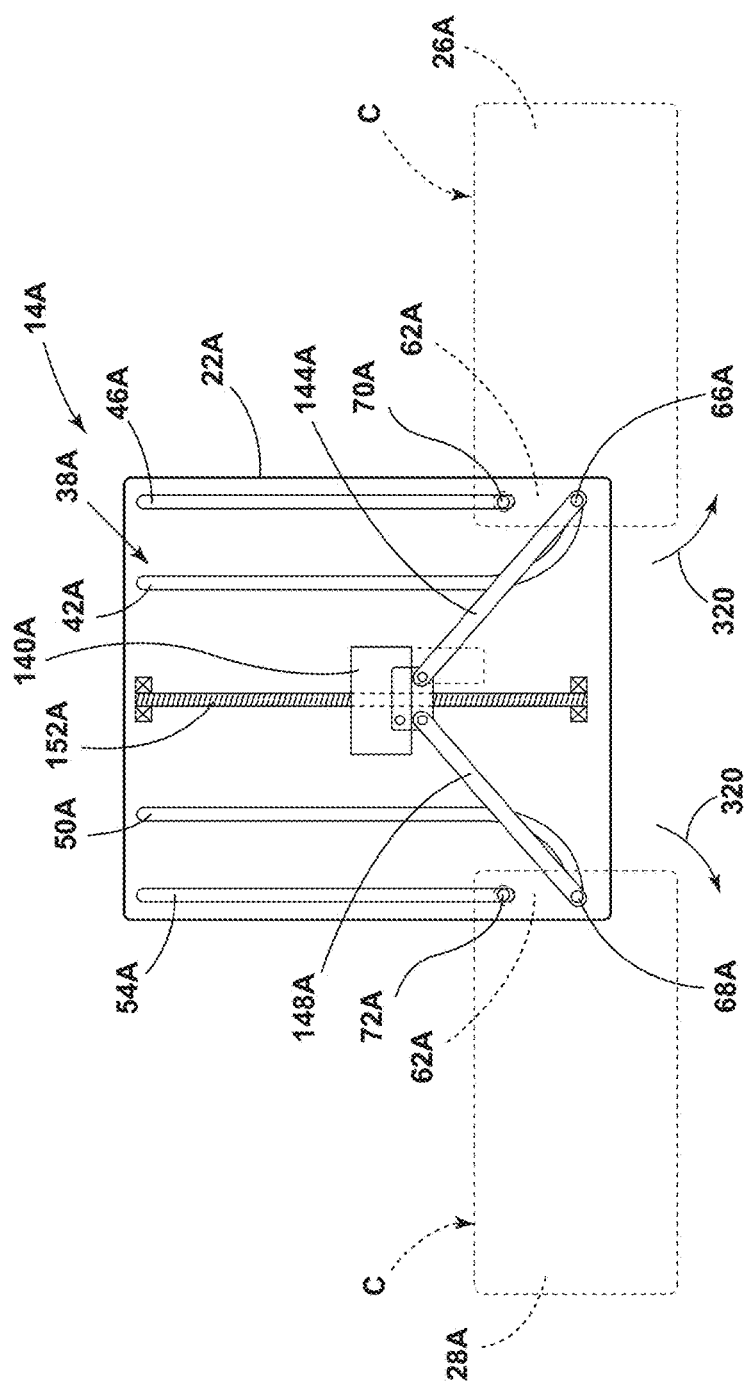
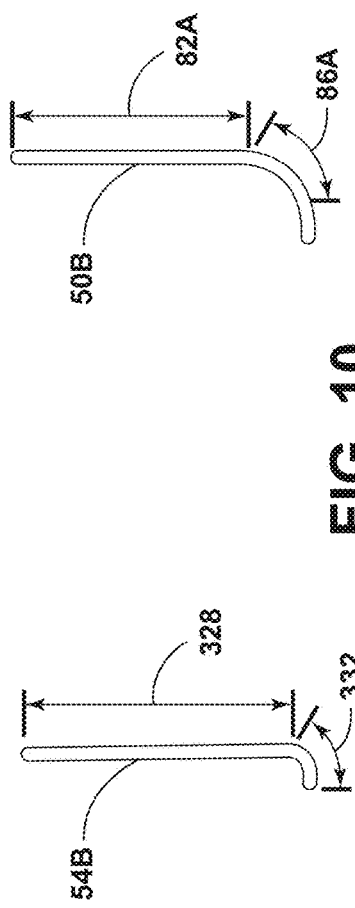
FIG. 8
FIG. 9
FIG. 10

SUPPORT ASSEMBLY

FIELD OF THE DISCLOSURE

The present disclosure generally relates to a support assembly.

BACKGROUND OF THE DISCLOSURE

Various support assemblies serve various needs. A support assembly that may be positioned in various configurations is desirable.

SUMMARY OF THE DISCLOSURE

According to a first aspect of the present disclosure, a support assembly for a vehicle is provided. The support assembly includes a base fixedly coupled to a vehicle interior, a panel disposed on the base, and a track assembly disposed between the base and the panel. The track assembly includes a track and an actuator slidably coupled with the track and coupled with the panel and movable from a first position to a second position to move the panel from a stored position to a deployed position.

Embodiments of the first aspect of the present disclosure can include any one or a combination of the following features:
- the track includes a first track and a second track, wherein the actuator is slidably coupled with the first track, and wherein the panel is rotatably coupled to the second track;
- the first track includes a substantially straight segment that is substantially parallel to the second track;
- the first track includes a curved segment;
- the curved segment extends toward the second track;
- in the stored position the panel is substantially aligned with the base and wherein in the deployed position the panel is transverse to the base;
- the actuator includes a linearly displaceable hub movable along an actuator path, wherein the hub is in the first position if the panel is in the stored position, and wherein the hub is in the second position if the panel is in the deployed position;
- the actuator includes a linkage disposed between the hub and the first track;
- the linkage is pivotably coupled to the hub and wherein the linkage is pivotably coupled to the first track; and/or
- the actuator is movable along a lead screw disposed along the actuator path.

According to a second aspect of the present disclosure, a support assembly for a vehicle is provided. The support assembly includes a base disposed in a vehicle interior, a pair of support members, and a track assembly coupled to the base and the pair of support members. The track assembly includes a pair of inner tracks and a pair of outer tracks, wherein the pair of support members are movable between a stored position and a deployed position and wherein the pair of support members are disposed transverse to the outer tracks in the deployed position.

Embodiments of the second aspect of the present disclosure can include any one or a combination of the following features:
- an actuator coupled to the pair of support members and movable between a first position and a second position as the pair of support members move from the stored position to the deployed position;
- the base includes an ottoman and wherein the pair of support members includes a pair of panels; and/or
- the pair of inner tracks and the pair of outer tracks are at least partially defined by recesses in the ottoman.

According to a third aspect of the present disclosure, a support assembly for a vehicle is provided. The support assembly includes a base, a support member movable from a stored position to a deployed position, an actuator coupled to the support member and configured to exert a force on the support member to move the support member from the stored position to the deployed position. The support assembly includes a first support member coupling between the base and the support member, and a second support member coupling between the base and the support member, wherein the first support member coupling is slidable along a first path disposed on the base and wherein the second support member coupling is slidable along a second path disposed on the base.

Embodiments of a third aspect of the present disclosure can include any one or a combination of the following features:
- each of the first path and the second path include a first end and a second end and wherein if the second support member coupling is at the second end of the second path, then the support member is rotatable to the deployed position;
- the first support member coupling is movable along a curved segment of the first path as the support member is rotated to the deployed position;
- the first path includes a substantially straight segment and the curved segment;
- the support member is rotatable at least 45 degrees along the curved segment; and/or
- if the support member is in the deployed position, then the first support member coupling, the second support member coupling, and the second path are aligned.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a top elevational view of a support assembly with the support members in the deployed positon, according to another aspect of the disclosure;

FIG. 9 is a top elevational view of a second track, according to an aspect of the disclosure;

FIG. 10 is a top elevational view of a first track, according to an aspect of the disclosure;

DETAILED DESCRIPTION

Figure 1A:
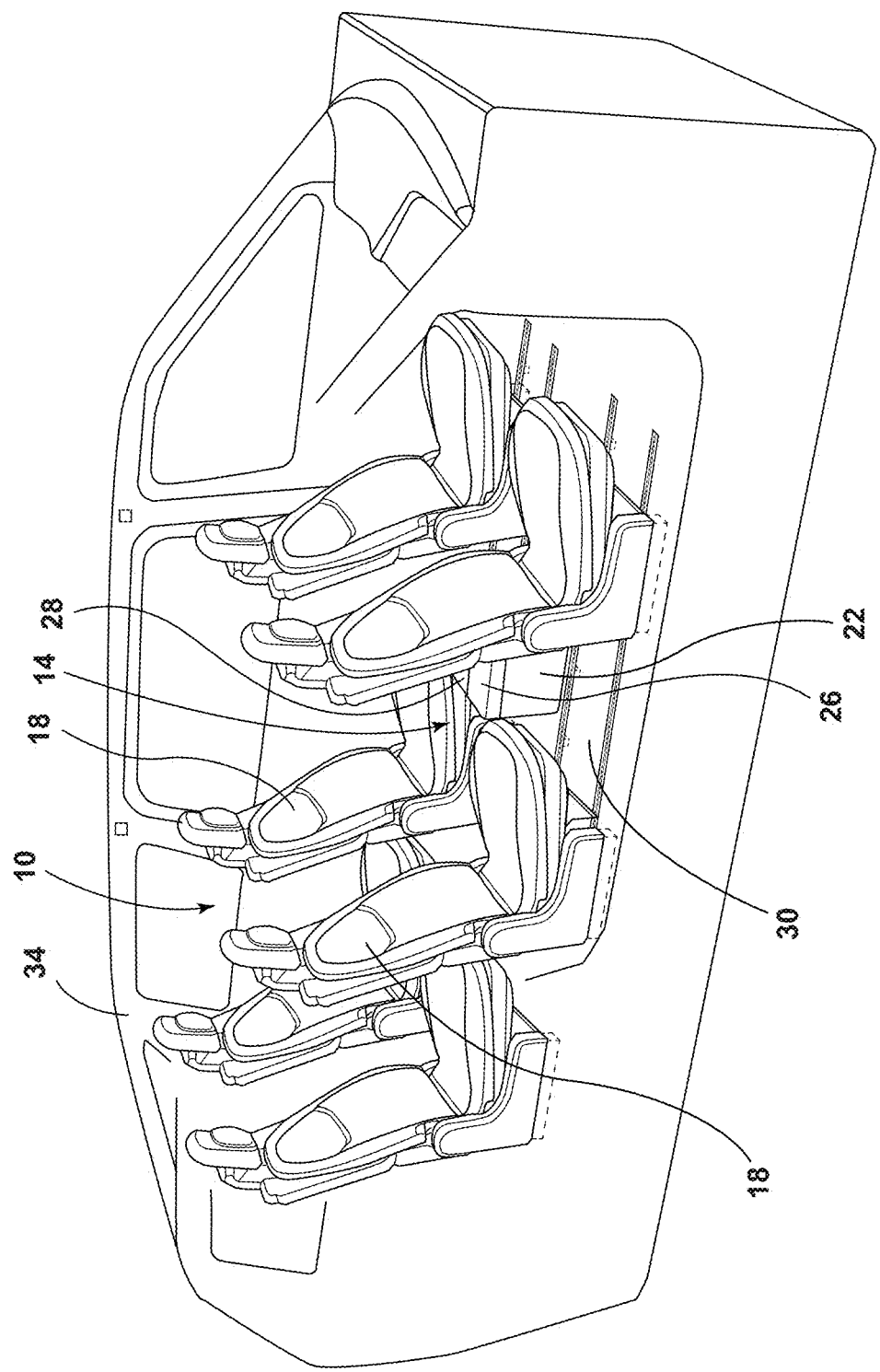
FIG. 1A is a perspective view of a vehicle interior with a support assembly, according to an aspect of the disclosure.
Figure 1B:
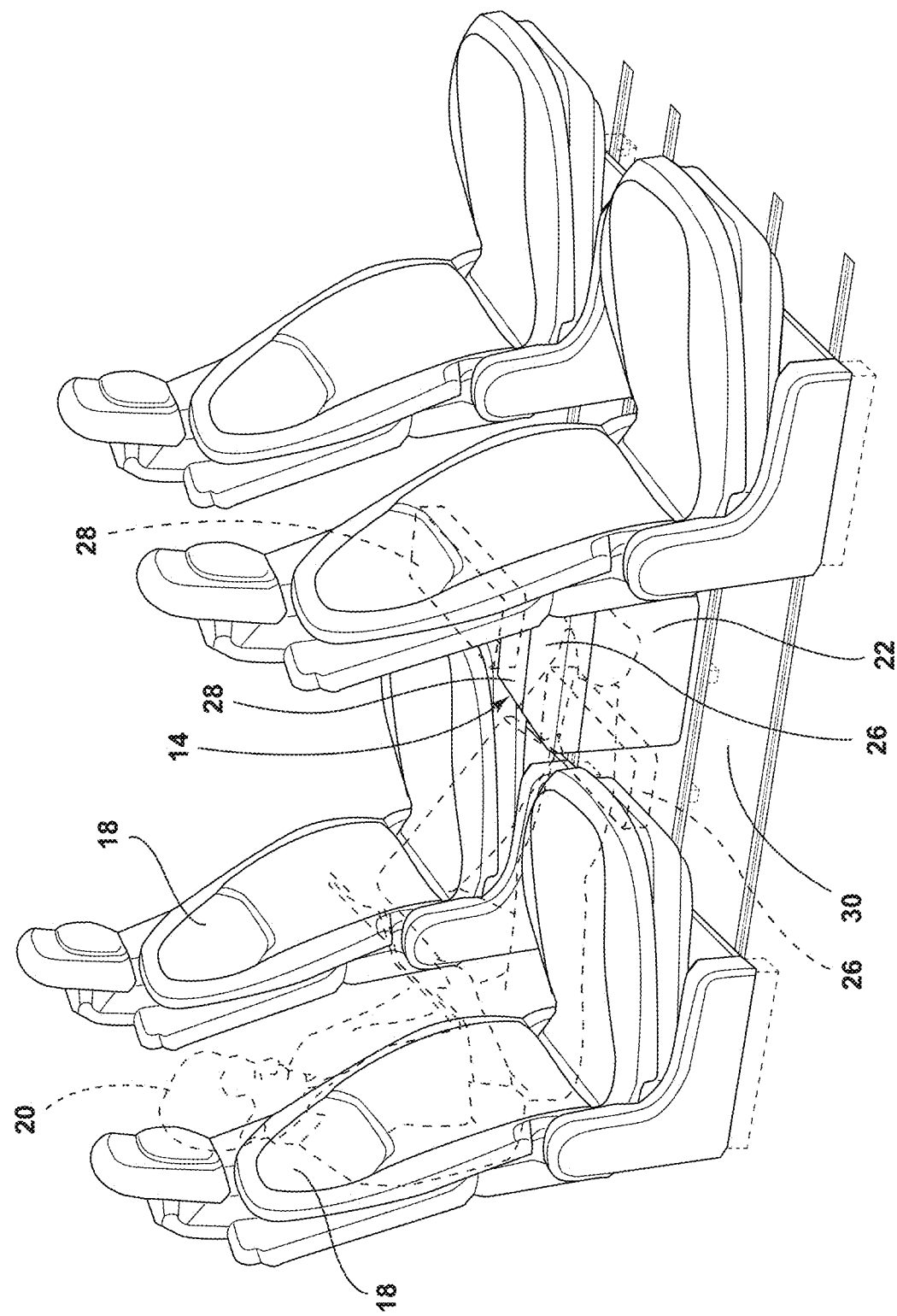
FIG. 1B is an exploded view of a portion of the vehicle interior with a support assembly of FIG. 1A.

Referring to FIGS. 1A-1B, a vehicle interior 10 is shown with a support assembly 14 disposed in front of seating assemblies 18. An occupant 20 may be seated in seating assembly 18. Vehicle occupants may dispose their personal items on the support assembly 14. Occupants may use the support assembly 14 as a leg rest. The support assembly 14 may include a base 22 and support members 26 and 28. The support members 26 and 28 may be moved between a stored position A and a deployed position C. When the support members 26 and 28 are in the deployed position C, then the support assembly 14 may provide more storage area than when the support members 26 and 28 are in the stored position A. The support members 26 and 28 in the deployed position C may be positioned in front of seating assemblies 18, thereby providing footrests for occupants seated in the seating assemblies 18. The support members 26 and 28 may be positioned in intermediate positions (for example, intermediate position B) between the stored position A and the deployed position C. The support assembly 14 may be fixed to the vehicle floor 30 or another vehicle structure. In one example, a support assembly 14 may be fixed to a side of a console or other structure disposed proximate seating assemblies 18 located in front of the support assembly 14. In some examples, the support assembly 14 may be referred to as an ottoman.

With reference to FIGS. 1A-12, a support assembly 14 for a vehicle 34 includes a base 22 fixedly coupled to a vehicle interior 10. The support assembly 14 also includes a support member 26 disposed on the base 22. A track assembly 38 is disposed between the base 22 and the support member 26. The track assembly 38 includes a track (for example, first track 42) and an actuator 58 slidably coupled with the track (for example, first track 42) and coupled with the support member 26. The actuator 58 is movable from a first position G to a second position H to move the support member 26 from a stored position A to a deployed position C.

Figure 2:
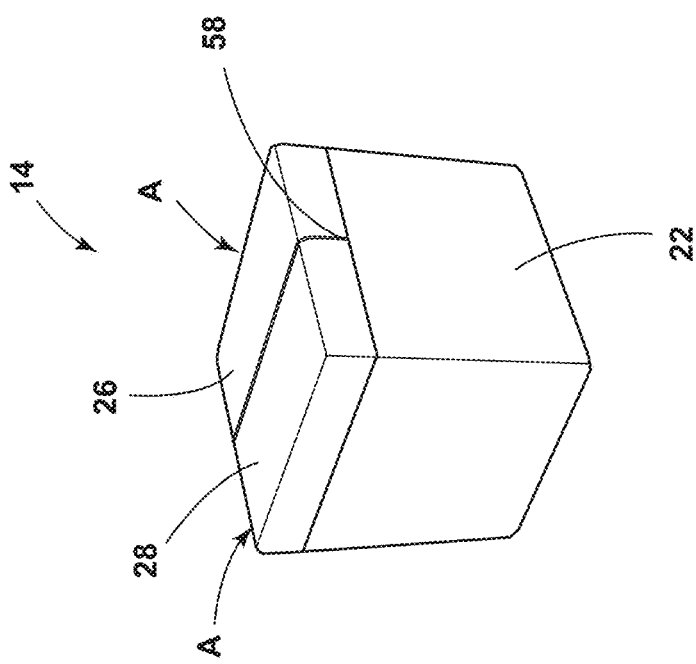
FIG. 2 is a perspective view of a support assembly with the support members in the stored position, according to an aspect of the disclosure.

With reference to FIG. 2, the support assembly 14 is shown with the support members 26, 28 in the stored position A. The support members 26, 28 may be disposed on top of the base 22.

Figure 3:
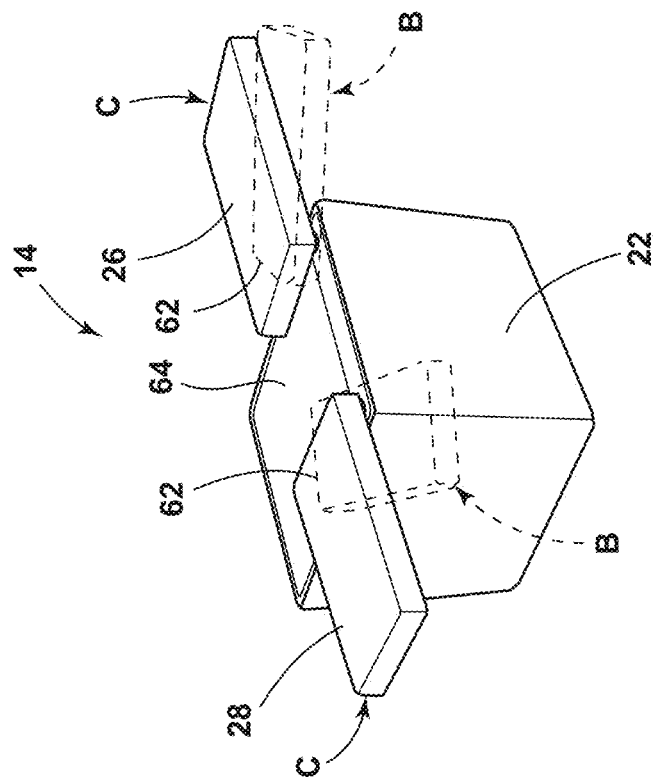
FIG. 3 is a perspective view of a support assembly with the support members in the deployed position, according to an aspect of the disclosure.

Referring to FIG. 3, the support assembly 14 is shown with the support members 26, 28 in the deployed positon C. The support members 26, 28 may extend away from the base 22. The support members 26 and 28 may be transverse to the base 22. The ends 62 of the support members 26 and 28 may be disposed over the top surface 64 of the base 22.

Figure 4A:
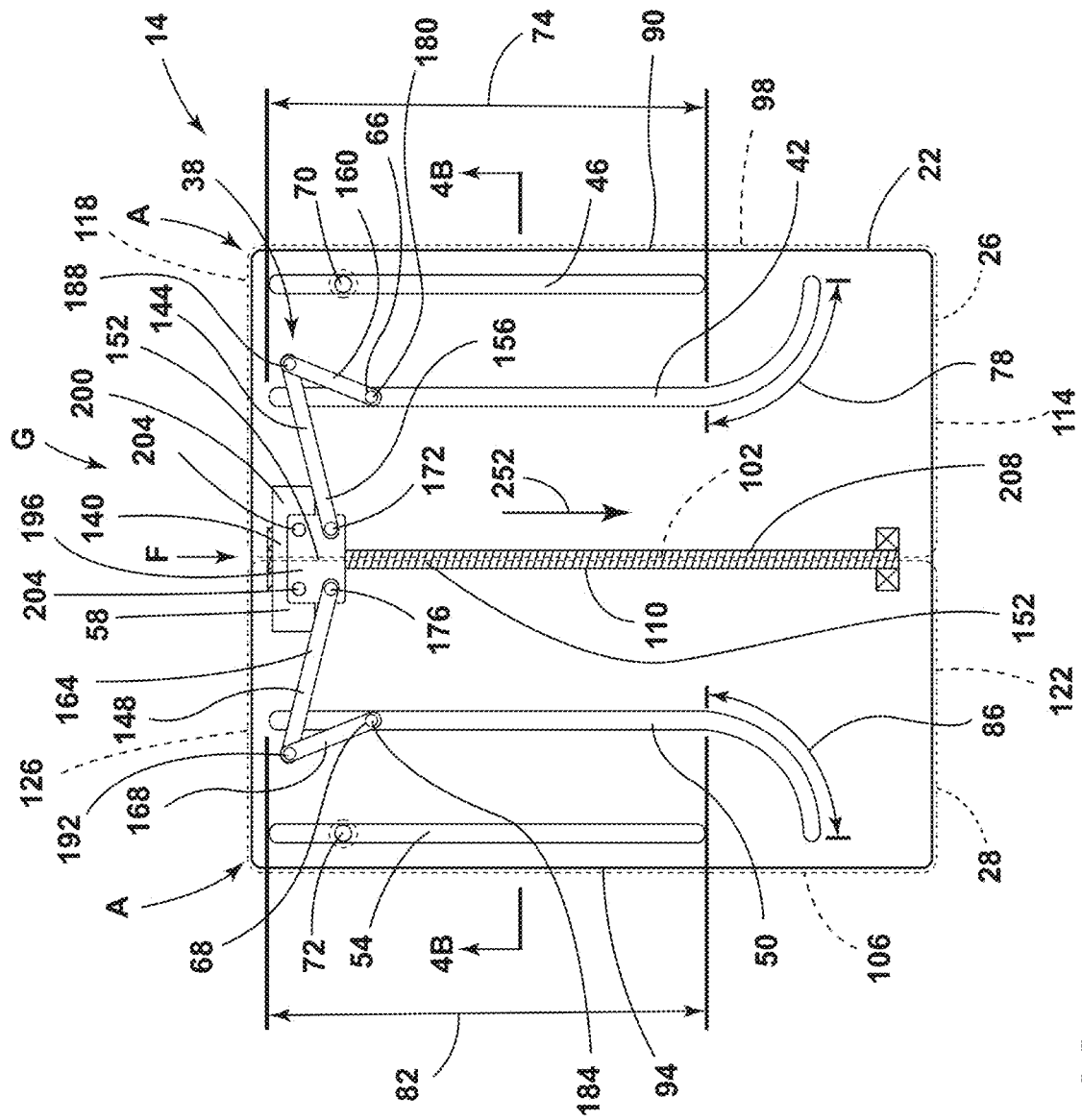
FIG. 4A is a top elevational view of the track assembly with the support members in the stored position, according to an aspect of the disclosure.

Referring now to FIG. 4A, a top elevational view of the base 22 is shown. A track assembly 38 may be disposed on the base 22. The support members 26 and 28 are shown disposed above the base 22. In the example shown, a track assembly 38 for moving the support member 26 and the support member 28 between the stored position A and the deployed position C may include a first track 42, a second track 46, a first track 50, a second track 54, and an actuator 58. The support member 26 may be slidably coupled with the first track 42 at first support member coupling 66. The support member 28 may be slidably coupled to the first track 50 at first support member coupling 68. The actuator 58 may be slidably coupled with the first track 42 and the first track 50. The support member 26 may be slidably coupled with the second track 46 at second support member coupling 70 disposed between the support member 26 and the second track 46. The support member 28 may be slidably coupled with the second track 54 at second support member coupling 72 disposed between the support member 28 and the second track 54. The first support member pivotable coupling 66 and the second support member pivotable coupling 70 may each include a protrusion extending from the support member 26 and toward the base 22. The first support member pivotable coupling 68 and the second support member pivotable coupling 72 may each include a protrusion extending from the support member 28 and toward the base 22.

With continued reference to FIG. 4A, the first tracks 42 and 50 may each include a respective substantially straight segment 74 and 82 and a respective curved segment 78 and 86. The second tracks 46 and 54 may be substantially straight. The second tracks 46 and 54 may be substantially parallel to the respective substantially straight segments 74 and 82 of each of the respective first tracks 42 and 50. The curved segments 78 and 86 of the respective first tracks 42 and 50 may extend toward the respective second tracks 46 and 54. The curved segments 78 and 86 of the respective first tracks 42 and 50 may extend toward the respective edges 90 and 94 of the base 22.

Referring again to FIG. 4A, in the stored position C, the support members 26 and 28 may be substantially aligned with the base 22. Support member 26 may include a longitudinal outer edge 98 and a longitudinal inner edge 102. Support member 28 may include a longitudinal outer edge 106 and a longitudinal inner edge 110. Support member 26 may include lateral outer edges 114 and 118. Support member 28 may include lateral outer edges 122 and 126. The longitudinal outer edge 98 and the longitudinal inner edge 102 of the support member 26 may be substantially parallel to the substantially straight segment 74 of the inner track (for example, first track 42) and the outer track (for example, second track 46) of support member 26 when the support member 26 is in the stored position A. The longitudinal outer edge 106 and the longitudinal inner edge 110 of the support member 28 may be substantially parallel to the substantially straight segment 82 of the inner track (for example, first track 50) and the outer track (for example, second track 54) of support member 28 when the support member 28 is in the stored position A.

With continued reference to FIG. 4A, the actuator 58 may include a linearly displaceable hub 140. The actuator 58 may also include a linkage 144 and a linkage 148. The linearly displaceable hub 140 may be movable along an actuator path 152. When the support members 26 and 28 are in the stored position A, then the hub 140 may be in a first position G. The linkage 144 may be disposed between the hub 140 and the first track 42. The linkage 144 may include a hub link 156 and a track link 160. The hub link 156 may be pivotably coupled to the hub 140 at the hub link pivotable coupling 172. The track link 160 may be pivotably coupled to the first track 42 at the track link pivotable coupling 180. The track link pivotable coupling 180 may also be coupled to the first support member coupling 66. The track link pivotable coupling 180 and the first support member coupling 66 may have a common axis. The hub link 156 may be coupled to the track link 160 at the hub link-track link pivotable coupling 188.

With continued reference to FIG. 4A, the linkage 148 may be disposed between the hub 140 and the first track 50. The linkage 148 may include a hub link 164 and a track link 168. The hub link 164 may be pivotably coupled to the hub 140 at the hub link pivotable coupling 176. The track link 168 may be pivotably coupled to the first track 50 at the track link pivotable coupling 184. The track link pivotable coupling 184 may also be coupled to the first support member coupling 68. The track link pivotable coupling 184 and the first support member coupling 68 may have a common axis. The hub link 164 may be coupled to the track link 168 at the hub link-track link pivotable coupling 192. The linkage 144 and the linkage 148 may act as push arms connected to a motor in the hub 140 during movement of the respective support members 26 and 28 from the stored position A to the deployed position C and during movement of the respective support members 26 and 28 from the deployed position C to the stored position A. Springs and mechanical energy storage devices may be used to aid in the movement of the support members 26 and 28 from the stored position A to the deployed position C and from the deployed position C to the stored position A.

With continued reference to FIG. 4A, the hub 140 may include a top portion 196 and a bottom portion 200. The top portion 196 may include the hub link pivotable couplings 172 and 176. The top portion 196 may also include fasteners 204 that may attach the top portion 196 to the bottom portion 200. The bottom portion 200 may be coupled to a lead screw 208 that may extend along the base 22. In the example shown, the lead screw 208 may define the actuator path 152. The lead screw 208 may be substantially parallel to the substantially straight segments 74 and 82 of the respective first tracks 42 and 50. The hub 140 may include a motor for moving the hub 140 along the lead screw 208. In one example, the motor may cause a threaded coupling disposed within the bottom portion 200 to rotate around the lead screw 208 to move the bottom portion 200 along the lead screw 208. In other examples, a force F1 may be applied by the actuator 58 to move the actuator 58 from the stored position A to the deployed position C. The actuator 58 may be automated or manual.

Figure 4B:
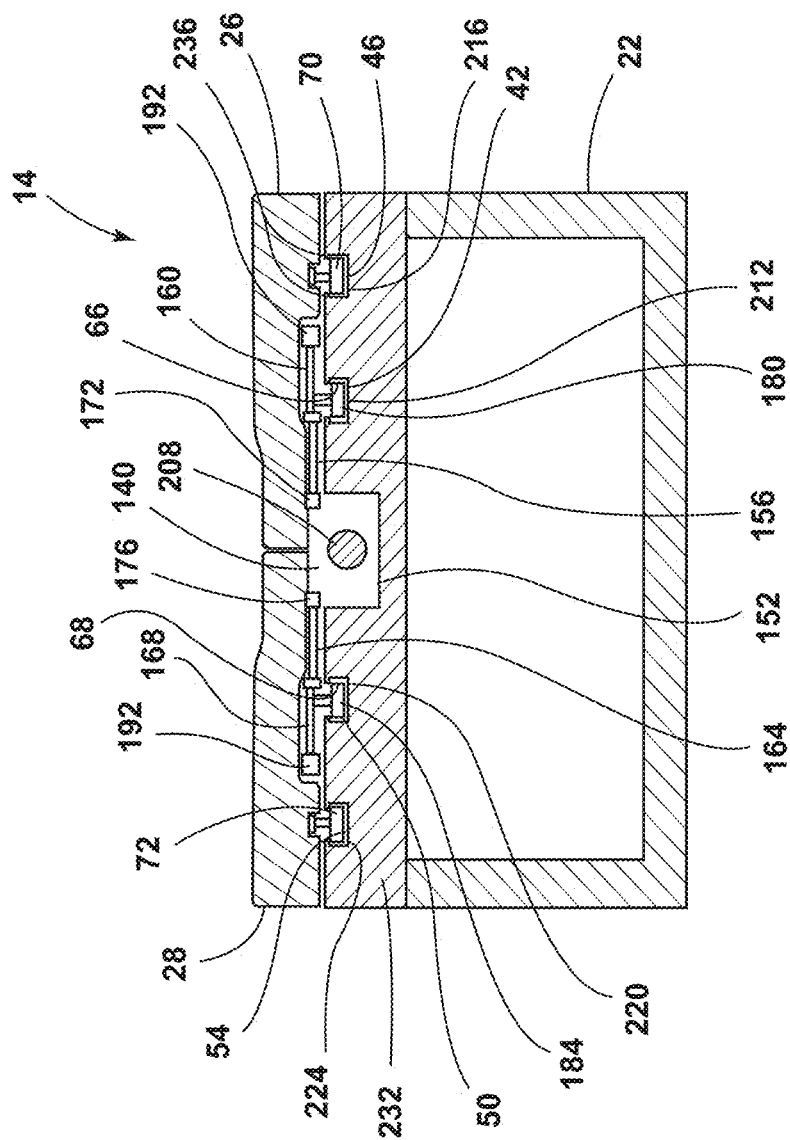
FIG. 4B is a cross-sectional view of the track assembly taken along line 4B-4B of FIG. 4A, according to an aspect of the disclosure.

With reference to FIGS. 4A and 4B, the first tracks 42 and 50 may be defined by respective first recesses 212 and 220 in the base 22. The second tracks 46 and 54 may be defined by respective second recesses 216 and 224 in the base 22. The first tracks 42 and 50 and the second tracks 46 and 54 may also be defined by separate track pieces, such as metal or composite track pieces, disposed in first recesses 212 and 220 and in the second recesses 216 and 224 in the base 22. In some examples, the track assembly 38 may be in a plate 232 that may be incorporated in the base 22 or disposed on the base 22. The first tracks 42 and 50 and the second tracks 46 and 54 may also include flanges 236 that may maintain the first support member couplings 66 and 68 and the second support member couplings 70 and 72 within the respective first tracks 42 and 50 and second tracks 46 and 54 as the support members 26 and 28 are moved from the stored position A to the deployed position C. Other designs for maintaining the first support member couplings 66 and 68 and the second support member couplings 70 and 72 in the respective first tracks 42 and 50 and second tracks 46 and 54 may also be used. For example, an interior of a track may include opposing ridges extending outward from opposing inner walls of the track. The ridges may be positionable in a recess in a wheel that may be part of a pivotable coupling. As such, the pivotable coupling may be secured in the track by the interference between the ridges extending inward from the inner walls of the track and into the recess extending into the wheel and around the circumference of the wheel.

Figure 5:
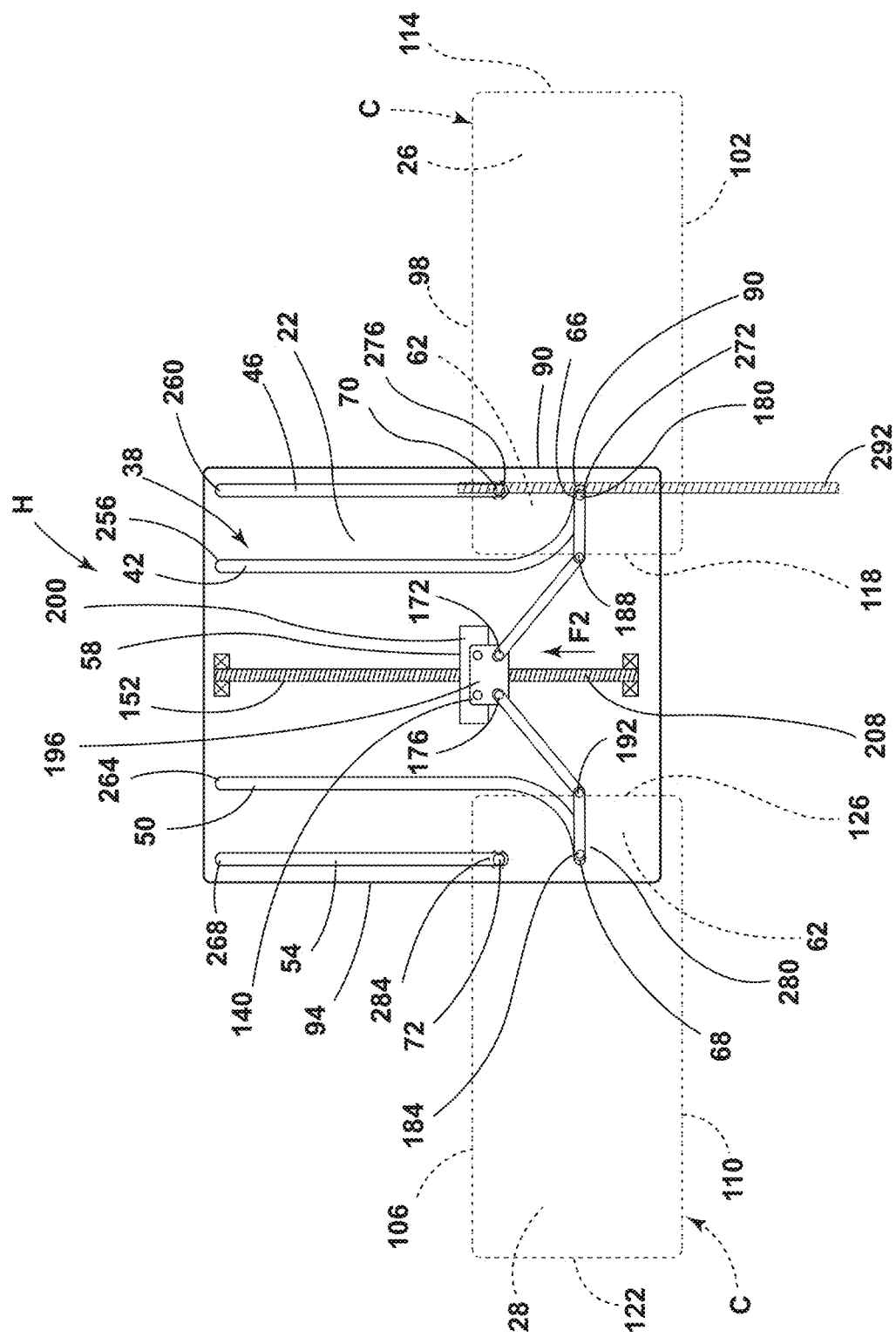
FIG. 5 is a top elevational view of the track assembly of FIG. 4 with the support members in the deployed position, according to an aspect of the disclosure.

With reference to FIG. 5, the support members 26 and 28 are shown in the deployed position C. The support members 26 and 28 may be transverse to the base 22 when the support members 26 and 28 are in the deployed position C. The hub 140 may be in the second position H when the support members 26 and 28 are transverse to the respective edges 90 and 94 of the base 22. The hub 140 may move along the actuator path 152 in the direction shown by arrow 252 from the first position G to the second position H, thereby moving the support members 26 and 28 from the respective stored position A to the deployed position C.

Referring again to FIG. 5, first track 42 may include a first end 256 and a second end 272. The second track 46 may include a first end 260 and a second end 276. The first track 50 may include a first end 264 and a second end 280. The second track 54 may include a first end 268 and a second end 284.

Referring again to FIG. 5, if the second support member coupling 70 is at the second end 276 of the second path (for example, second track 46), then the support member 26 is movable to the deployed position C. The first support member coupling 66 may be moved along the first path (for example, first track 42) as the support member 26 is rotated to the deployed position C. In one example, the support member 26 may be rotatable in the range of approximately 25 degrees to approximately 65 degrees and ideally approximately 45 degrees along the curved segment 78 to the deployed position C of the support member 26. In another example, the support member 26 may be rotatable in the range of approximately 65 degrees to approximately 115 degrees and ideally approximately 90 degrees along the curved segment 78 to the deployed position C of the support member 26. In another example, the support member 26 may be rotatable more than 90 degrees along the curved segment 78 to the deployed position C of the support member 26. With continued reference to FIG. 5, if the support member 26 is in the deployed position C, then the second support member coupling 70, the first support member coupling 66, and the second track 46 may be aligned in a substantially straight line 292.

With continued reference to FIG. 5, if the second support member coupling 72 is at the second end 284 of the second path (for example, second track 54), then the support member 28 is movable to the deployed position C. The first support member coupling 68 may be moved along the first path (for example, first track 50) as the support member 28 is rotated to the deployed position C. In one example, the support member 28 may be rotatable in the range of approximately 25 degrees to approximately 65 degrees and ideally approximately 45 degrees along the curved segment 86 to the deployed position C of the support member 28. In another example, the support member 28 may be rotatable in the range of approximately 65 degrees to approximately 115 degrees and ideally approximately 90 degrees along the curved segment 86 to the deployed position C of the support member 28. In another example, the support member 28 may be rotatable more than 90 degrees along the curved segment 86 to the deployed position C of the support member 28. With continued reference to FIG. 5, if the support member 28 is in the deployed position C, then the second support member coupling 72, the first support member coupling 68, and the second track 54 may be aligned in a substantially straight line similar to substantially straight line 292. The support members 26 and 28 may be substantially the same size.

Referring to FIGS. 1A-5, it is to be understood that the support members 26 and 28 may be moved from the deployed position C to the stored position A by exerting a force F2 on the actuator 58 to move the actuator 58 from the second position H to the first position G, thereby moving the support members 26 and 28 from the deployed position C to the stored position A.

Figure 6:
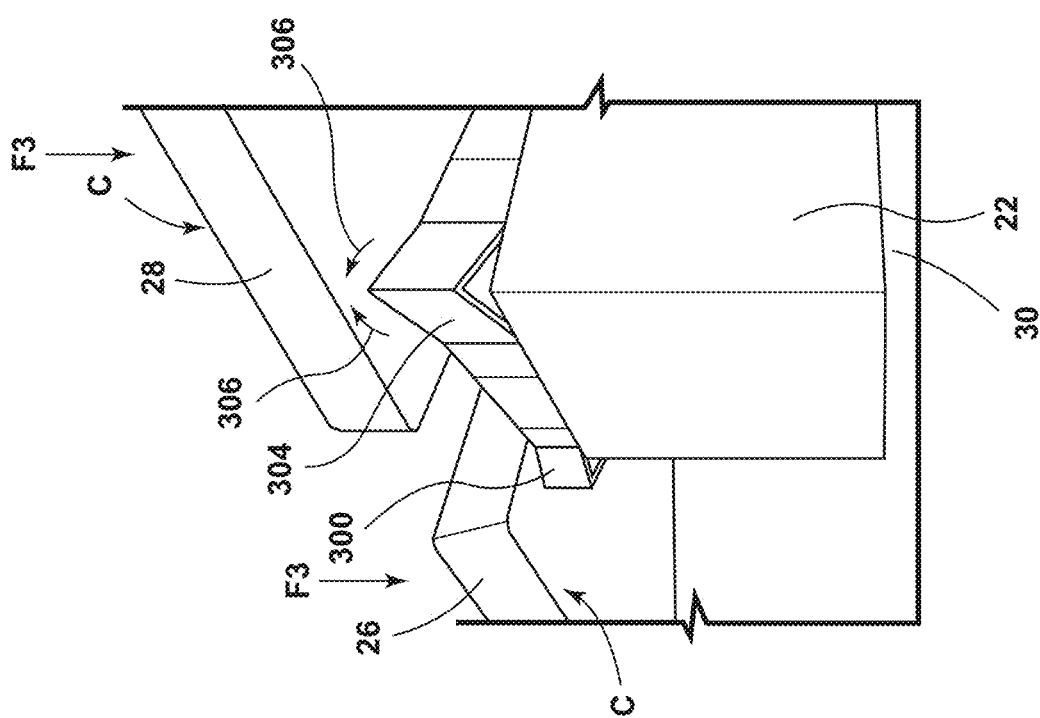
FIG. 6 is a perspective view of the support assembly with props disposed below the support members, according to an aspect of the disclosure.

Referring now to FIG. 6, props 300 and 304 may support the support members 26 and 28. Props 300 and 304 may extend from the corners of the base 22 when the support members 26 and 28 are in the deployed position C. The props 300 and 304 may move in the directions shown by arrows 306 from the stored position A to the deployed position C. The props 300 and 304 may move in the directions opposite those shown by arrows 306 to move from the deployed position C to the stored position A. The prop 300 may be coupled with the support member 26, the track assembly 38, and/or the actuator 58. The prop 304 may be coupled with the support member 28, the track assembly 38, and/or the actuator 48. Movement of the support members 26 and 28 between the stored position A and deployed position C and the actuator 58 between the first position G and second position H may cause corresponding movement of the props 300 and 304. As such, the props 300 and 304 may support the support members 26 and 28 when the props 300 and 304 are in the deployed position C. The props 300 and 304 may also stabilize the support members 26 and 28 when downward force F3 is exerted on the support members 26 and 28.

Figure 7:
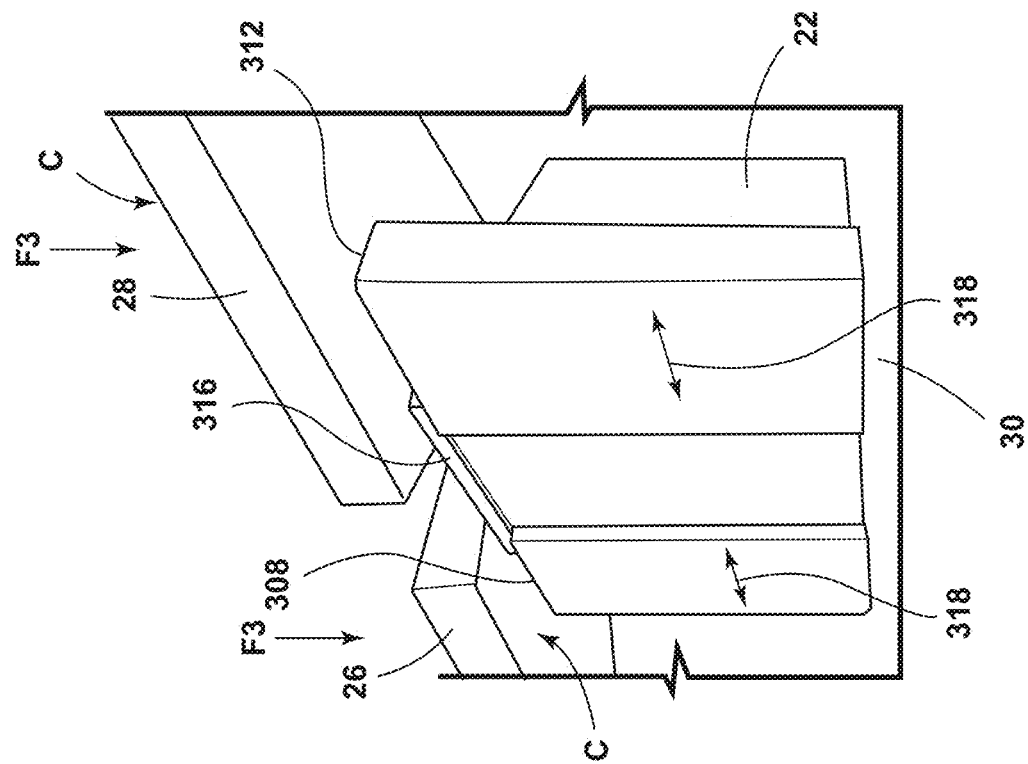
FIG. 7 is a perspective view of the support assembly with props disposed below the support members, according to another aspect of the disclosure.

With reference to FIG. 7, the props 308 and 312 may extend from the base 22 when the support members 26 and 28 move from the stored position A to the deployed position C. The props 308 and 312 may extend between the support members 26 and 28 and the vehicle floor 30. The props 308 and 312 may slide along a track 318 disposed in the base 22. The prop 308 may be coupled with the support member 26, the track assembly 38, and/or the actuator 58. The prop 312 may be coupled with the support member 28, the track assembly 38, and/or the actuator 58. Movement of the support members 26 and 28 between the stored position A and the deployed position C and the actuator 58 between the first position G and the second position H may cause corresponding movement of the props 308 and 312. The props 308 and 312 may support the support members 26 and 28 when the support members 26 and 28 are in the deployed position C. The props 308 and 312 may also stabilize the support members 26 and 28 when downward forces F3 are exerted on the support members 26 and 28.

With continued reference to FIGS. 6 and 7, various downward forces F3 may be exerted on the support members 26, 28, including downward forces exerted by the legs of an occupant, other body parts of an occupant, and objects disposed on the support members 26, 28.

Referring now to FIG. 8, support assembly 14A is shown. Support assembly 14A may include linkages 144A and 148A. The track assembly 38A may include first track 42A, second track 46A, first track 50A, second track 54A, and actuator 58A. The actuator 58A may include a hub 140A, a linkage 144A corresponding to support member 26A, and a linkage 148A corresponding to support member 28A. The hub 140A may move along an actuator path 152A. Second support member coupling 70A may be disposed between the second track 46A and the support member 26A. Second support member coupling 72A may be disposed between the second track 54A and the support member 28A. First support member coupling 66A may be disposed between the first track 42A and the support member 26A. Second support member coupling 68A may be disposed between the first track 50A and the support member 28A. The support members 26A and 26B may move in the directions shown by arrows 320 between stored position A and deployed position C.

Referring to FIG. 9, an example of a second track 54B is shown. The second track 54B may include a substantially straight segment 328 and a curved segment 332.

Referring to FIG. 10, an example of a first track 50B is shown. The first track 50B may include a substantially straight segment 82A and a curved segment 86A.

Figure 12:
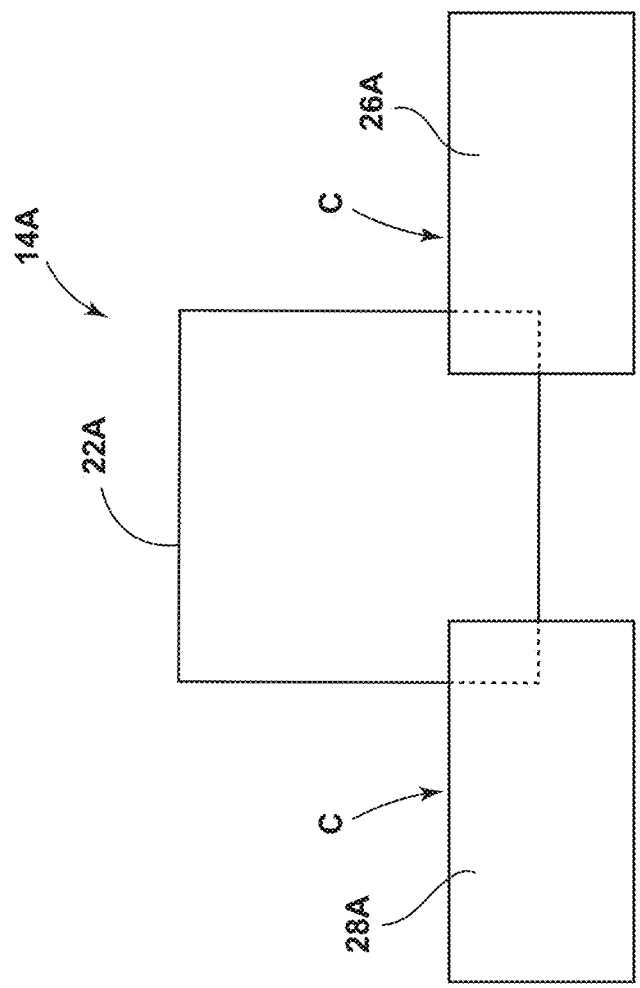
FIG. 12 is a schematic view of the support assembly of FIG. 11 with the support members in the deployed position, according to an aspect of the disclosure.
Figure 11:
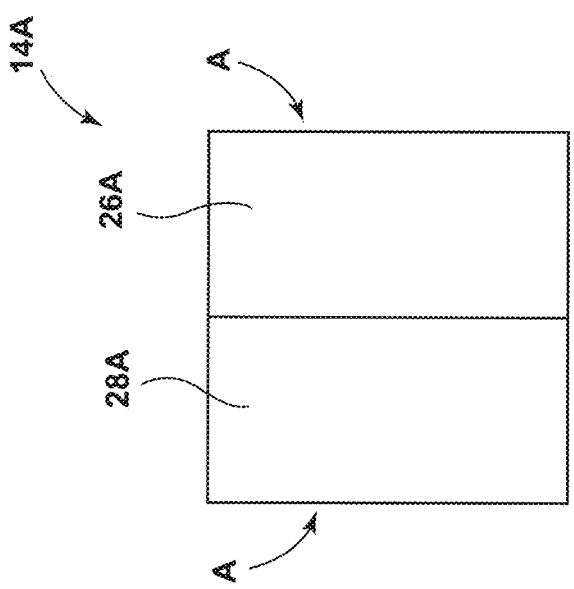
FIG. 11 is a schematic view of a support assembly with the support members in the stored position, according to an aspect of the disclosure.

Referring now to FIGS. 11 and 12, schematic views of the top of the support assembly 14A are shown. The support members 26A and 28A are shown in the stored position A in FIG. 11. The support members 26A and 28A are shown in the deployed position C in FIG. 12.

Referring to FIGS. 1A-12, the support assembly 14 for a vehicle 34 may include a base 22 disposed in a vehicle interior 10, a pair of support members 26 and 28, and a track assembly 38 coupled to the base 22 and the pair of support members 26 and 28 and including a pair of inner tracks (for example, first tracks 42 and 50) and a pair of outer tracks (for example, second tracks 46 and 54). The pair of support members 26 and 28 may be movable between a stored position A and a deployed position C. The pair of support members 26 and 28 may be disposed transverse to the outer tracks (for example, second tracks 46 and 54) in the deployed position C.

Referring to FIGS. 1A-12, the support assembly 14 for a vehicle may include a base 22, a support member 26 movable from a stored position A to a deployed position C, an actuator 58, a first support member coupling 66 between the base 22 and the support member 26, and a second support member coupling 70 between the base 22 and the support member 26. The actuator 58 may be configured to exert a force F1 on the support member 26 to move the support member 26 from the stored position A to the deployed position C. The first support member coupling 66 may be slidable along a first path (for example, first track 42) disposed on the base 22. The second support member coupling 70 may be slidable along a second path (for example, second track 46) disposed on the base 22.

In one example, the support members 26 and 28 may slide along the track assembly 38 towards a seated occupant prior to rotating to the deployed position C. In another example, the support members 26 and 28 may negligibly slide along the track assembly 38 towards a seated occupant prior to rotating to the deployed position C.

In one example of the disclosure, the support assembly 14 may be an ottoman. The support assembly 14 may be a cubical ottoman. In another example of the disclosure, the support assembly 14 may be a rectangular ottoman. The support assembly 14 may also be a circular ottoman, a rounded ottoman, or an ottoman of another shape. The support members 26 and 28 may be panels that may be disposed on the ottoman or in the ottoman. The panels may serve a variety of functions (for example, leg rest, table, etc.) in the stored position A, the intermediate position B, and the deployed position C.

In some aspects of the disclosure, the support assembly 14 may be removable from the vehicle 34. The support assembly 14 may be detached from the vehicle 34, moved outside of the vehicle 34, used outside of the vehicle 34, moved back inside the vehicle 34, and reattached to the vehicle 34.

In addition to the support assemblies 14 and 14A shown, in various examples of a support assembly, a support assembly may include a single support member. Additionally, in various examples of a support assembly, a support assembly may include more than two support members.

A variety of advantages may be obtained by use of the present disclosure. A leg rest (for example, support member 26 and/or 28) may be located in a separate location from a seating assembly 18. A seating assembly that does not include an integral leg rest may be lighter than a seating assembly that includes an integral leg rest. The incorporation of a leg rest in a support assembly may include different design considerations than the incorporation of a leg rest in a seating assembly. An occupant may use the leg rest when the seatback of the seating assembly 18 is in an upright position and a reclined position. The surfaces of the support members 26 and 28 disposed on the support assembly 14 may have different appearances (for example, different trim covers) than the seating assembly 18.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A support assembly for a vehicle comprising:
a base fixedly coupled to a vehicle interior; and
a panel disposed on the base;
a track assembly disposed between the base and the panel and including:
    a track; and
    an actuator slidably coupled with the track and coupled with the panel and movable from a first position to a second position to move the panel from a stored position to a deployed position, wherein the track includes a first track and a second track, wherein the actuator is slidably coupled with the first track, and wherein the panel is rotatably coupled to the second track, wherein the first track includes a substantially straight segment that is substantially parallel to the second track, and wherein the first track includes a curved segment.

2. The support assembly for a vehicle of claim 1, wherein the curved segment extends toward the second track.

3. The support assembly for a vehicle of claim 2, wherein in the stored position the panel is substantially aligned with the base and wherein in the deployed position the panel is transverse to the base.

4. The support assembly for a vehicle of claim 2, wherein the actuator includes a linearly displaceable hub movable along an actuator path, wherein the hub is in the first position if the panel is in the stored position, and wherein the hub is in the second position if the panel is in the deployed position.

5. The support assembly for a vehicle of claim 4, wherein the actuator includes a linkage disposed between the hub and the first track.

6. The support assembly for a vehicle of claim 5, wherein the linkage is pivotably coupled to the hub and wherein the linkage is pivotably coupled to the first track.

7. The support assembly for a vehicle of claim 6, wherein the actuator is movable along a lead screw disposed along the actuator path.

8. A support assembly for a vehicle comprising:
a base disposed in a vehicle interior;
a pair of support members; and
a track assembly coupled to the base and the pair of support members and including:
    a pair of inner tracks; and
    a pair of outer tracks, wherein the pair of support members are movable between a stored position and a deployed position and wherein the pair of support members are disposed transverse to the outer tracks in the deployed position; and
an actuator coupled to the pair of support members and movable between a first position and a second position as the pair of support members move from the stored position to the deployed position, wherein the base is included in an ottoman and wherein the pair of support members includes a pair of panels.

9. The support assembly for a vehicle of claim 8, wherein the pair of inner tracks and the pair of outer tracks are at least partially defined by recesses in the ottoman.

10. A support assembly for a vehicle comprising:
a base;
a support member movable from a stored position to a deployed position;
an actuator coupled to the support member and configured to exert a force on the support member to move the support member from the stored position to the deployed position;
a first support member coupling between the base and the support member; and
a second support member coupling between the base and the support member, wherein the first support member coupling is slidable along a first path disposed on the base and wherein the second support member coupling is slidable along a second path disposed on the base, wherein each of the first path and the second path include a first end and a second end and wherein if the second support member coupling is at the second end of the second path, then the support member is rotatable to the deployed position, and wherein the first support member coupling is movable along a curved segment of the first path as the support member is rotated to the deployed position.

11. The support assembly for a vehicle of claim 10, wherein the first path includes a substantially straight segment and the curved segment.

12. The support assembly for a vehicle of claim 10, wherein the support member is rotatable at least 45 degrees along the curved segment.

13. The support assembly for a vehicle of claim 10, wherein if the support member is in the deployed position, then the first support member coupling, the second support member coupling, and the second path are aligned.

* * * * *